United States Patent [19]

Gordon

[11] Patent Number: 5,138,976

[45] Date of Patent: Aug. 18, 1992

[54] TANK COVER (IV)

[76] Inventor: Richard A. Gordon, 95 West 3rd St., Freeport, N.Y. 11520

[21] Appl. No.: 614,584

[22] Filed: Nov. 16, 1990

[51] Int. Cl.$^5$ .............................................. A01K 63/00
[52] U.S. Cl. ......................................... 119/5; 220/323
[58] Field of Search ................... 119/4, 5, 17; 220/323

[56] References Cited

U.S. PATENT DOCUMENTS

| 4,576,115 | 3/1986 | Gordon | 119/5 |
| 5,000,117 | 3/1991 | Gordon | 119/5 |
| 5,005,522 | 4/1991 | Gordon | 119/5 |

*Primary Examiner*—John G. Weiss
*Attorney, Agent, or Firm*—Bauer & Schaffer

[57] ABSTRACT

A cover for an animal tank is provided having oppositely outwardly facing hooks thereunder. One of the hooks is fixed in position on the underside of the frame, and the other hook is mounted to the bottom of a slide, which is slideably mounted underneath the frame. When the cover is placed on an animal tank and the lock plate slid outwardly in the frame and the frame is slid in the opposite direction on the top of the tank, the oppositely outward facing hooks engage underneath the interior peripheral shelf of the rim of the tank, securing the cover to the tank.

4 Claims, 1 Drawing Sheet

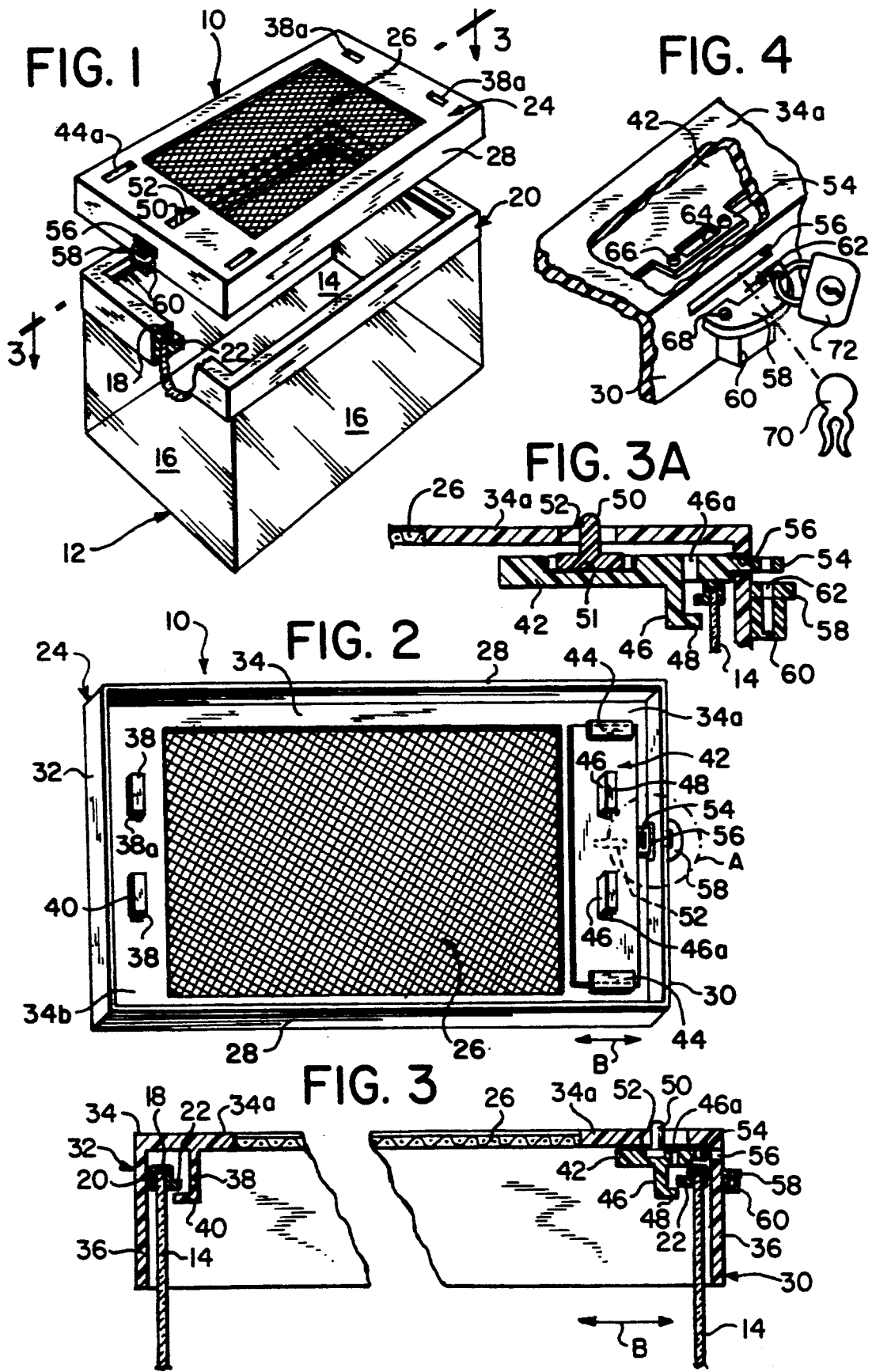

TANK COVER (IV)

FIELD OF THE INVENTION

The present invention relates to a cover for animal tanks and, more particularly, to a cover having means by which it may be for positively secured to the tank to prevent unintended removal or dislodgement therefrom.

BACKGROUND OF THE INVENTION

It is well known that aquarium-type tanks are often used to house lizards, snakes, ferrets, and the like as well as fish. Tanks so used require covers to prevent the unwanted egress of the inhabitants as well as to prevent unwanted entry of animals and persons, particularly children. The applicant is the owner of U.S. Pat. No. 4,576,115 and U.S. Pat. application Nos. 205,311 and 393,575, in which are described several tank covers, which have been found to be quite useful and which have been widely accepted by the consumer.

An important feature of an effective cover is that it should fasten securely to the tank. This is because rodents, reptiles, small amphibians, and other types of animals often have the ability to reach, push, or otherwise manipulate tank covers. Also, such animals are inherently hazardous, even when confined to their tanks, and it is important to prevent household dogs, cats, and children from reaching into the tank.

A contradictory objective is also apparent from the fact that it is periodically necessary to remove the cover to allow the owner to clean the tank and feed the animals. Thus, it is an object to provide an easily removable cover while being quite secure when applied to the tank.

It is also important that the means for securing such a cover operates quickly and easily so as to reduce the time in which the animal would have the opportunity to escape.

It is the object of the present invention to provide a cover for animal tanks and the like, which satisfies the above requirements by mounting quickly, easily, and securely to the tank,.while allowing air and light to freely pass in or out of the tank.

Other objects and advantages will be apparent to those skilled in the art from contemplation of the disclosure and drawings herein.

SUMMARY OF THE INVENTION

According to the present invention, a cover is provided for an animal tank, fish tank, or the like, which has an open top and peripheral side portions having a peripheral band forming a projecting shelf about its inner periphery. The cover consists of a flat screen attached integrally to a continuous frame, the cross section of which comprises a horizontal wall adapted to rest on top of the tank and a vertical wall adapted to fit over the outer peripheral side portion of the top of the tank. The frame is provided with a plurality of depending hook-like brackets secured to the underside of the horizontal wall and is provided with tabs, forming an outwardly directed horizontal flange adapted to engage underneath the interior shelf of the peripheral band. At least one set of such tabs is fixed directly to the frame along lone edge of the frame, and at least one set of such tabs is mounted to a movable slide which is movable toward and away from the other edge of the frame.

Thus configured, the frame is placed on top of the tank, first engaging the fixed tab flanges underneath the interior shelf. Then, the other end of the frame is lowered onto the tank, and the lock plate is slid outwardly in opposition to the fixed tabs so as to cause the tabs to secure underneath the interior shelf.

Full details of the invention are set forth in the following description and illustrated in the accompanying drawings.

BRIEF DESCRIPTION OF THE DRAWINGS

In the drawings:

FIG. 1 is a partially sectional perspective view of an animal tank and cover embodying the present invention;

FIG. 2 is a perspective view of the underside of the cover shown in FIG. 1; and

FIG. 3 is a sectional view of the tank cover as viewed along line 3—3 of FIG. 2;

FIG. 3a is an sectional view of the forward part of the cover shown in FIG. 2 showing the construction of the slide and operating handle; and FIG. 4 is an enlargement of the portion of the tank and cover contained in the circle label A of shown in perspective.

DETAILED DESCRIPTION OF THE INVENTION

As seen in FIG. 1, the tank cover of the present invention, generally depicted by the numeral 10, is adapted to be seated on the top of a conventional animal tank, generally depicted by the numeral 12. The animal tank 12 is rectilinear in shape, although it may have any polygonal or other configuration. The tank is provided with a base 14 on which sits vertical glass or plastic walls 16, sealed preferably with a silicone adhesive so as to be watertight and airtight. The walls 16 are of equal height, presenting an open top surrounded by a continuous peripheral glass edge 18 on which is located a continuous peripheral band 20, preferably of plastic, although metal or even ceramic may be used. The band 20 is formed, as seen in cross section (FIG. 3), in an inverted U-shape, the vertical arms of which frictionally straddle the top edge 18 of the glass and which are thereto by epoxy resin or the like. Extending horizontally inward from the inner vertical arm is a shelf 22, providing a continuous rigid peripheral shelf about the interior of the tank, in which glass covers or other tank auxiliary components are normally hung. While the shelf 22 has been shown somewhat enlarged or expanded here, the shelf is generally rather narrow and in some instances not a separately appearing member, but the lower edge of a band having a straight interior wall. The other elements or construction of the tank are conventional, and since they do not bear upon the present invention, they are not described.

The tank cover 10 of the present invention comprises an elongated rectangular frame 24, conforming in shape to the top of the tank 12 and surrounding a flat central screen 26. The frame consists of a pair of parallel long side 28 and transverse forward and rear smaller sides 30 and 32, respectively, all of which in cross section have horizontal walls 34 adapted to rest on the band 20 and have vertical side walls 36 depending therefrom to hang over the perimeter of the band 20. The screen 26 is affixed to the frame 24 by adhesion, heat sealing, or integral molding so as to securely cover the central opening and is of a mesh sufficient to allow air and light to circulate easily therethrough.

The horizontal wall portion 34a, at what is for convenience called the forward end 30 of the frame 24, is enlarged to form a wide panel. On the other hand, the horizontal wall portion 34b at the rear end 32 of the frame is enlarged to a lesser degree to provide a smaller panel subscript b.

A pair of L-shaped brackets, forming hooks 38 depend by their long legs from the underside of the rear plate 34b and terminate in short tabs 40 which point to but are spaced from the interior surface of the vertical wall at this side edge. The long legs of the hooks 38 are of a length sufficient to permit the tabs 40 to come to rest just below the inwardly extending shelf 22 found on the band 20 when the cover is placed on the tank. The tabs 40 are thus adapted to hook under the interior shelf 22 of the band 20 as illustrated in FIG. 3.

Mounted below the larger plate 34a at the forward end 30 of the frame is a slide 42 held in parallel planar relationship to the plate 34a by a pair of L-shaped skids 44 fixed along each of the transverse edges of the slide to the plate 34a. The slide 42 is reciprocably moveable in the direction of the double arrow B. A pair of L-shaped brackets, forming hooks 46 similar to those at the rear end 32 depend directly from the slide 42. The hooks are formed with tabs 48, projecting toward the vertical wall at the forward end 30.

The slide 42 is provided with a handle 50 which projects upwardly therefrom through a slot 52 in horizontal portion 34a. Manipulation of handle 50 causes the slide 42 to be moved toward and away from the vertical wall at the forward end 30, moving the tabs 48 between an operative locked position below the shelf 22 of the band 20 and an inoperative open position remote therefrom. As seen in FIG. 3a, the handle 50 is a separate member seating in a recess 51 on the upper face of the slide 42. The separability of the handle 50 from the slide 42, allows the slide to be removed from the skids 44, simply by raising the handle. Upon insertion, the handle 50 is placed into the slot 52 first and thereafter, the slide 42 is inserted into the skids.

Preferably the cover 10 is molded in a unitary manner together with the brackets 38 and skids 44 to provide a completely integral and unitary member. In molding the simple expedient of providing the mold with an L-shaped cavity for the bracket and skids requires the insertion of a mold block to frame out the hook-like tabs 40 and 44. As a result, the horizontal wall of the frame will be provided with associated slotted openings 38a and 44a for each of the brackets and skids. This has an advantage in permitting the brackets and skids a small degree of resiliency without any loss of strength.

Similarly, the slide 42 and its depending L-shaped hooks 46 are preferably uniformly molded as a result of which opening 46a will show up in the slide 42 in line with the hook tab 48. Further, in some tanks the lips 22 are omitted and the band presents the only lip formed only by the edge of the band, a slightly resilient bracket is advantageous as it will fit a variety of constructions.

As seen in FIGS. 2 and 4, a tongue 54 projects horizontally outward from the front of the slide 42 which tongue is adapted to protrude through a horizontal slot 56 located in the vertical wall 36 of the frame 24 at the forward end 30. It will be obvious that the tongue 54 of the slide rides on the top edge of the tank. Therefore, when placed on the tank, the cover is slightly higher at the front end than at the rear end. Extending fixedly from the exterior surface of the vertical wall just below the slot 56 and in cooperation with the tongue 54 is a horizontal flange 58 built upon a U-shaped channel 60 secured to the vertical wall 30. The flange 58 is provided with a vertical slot 62 conforming to the opening in the channel 60. The tongue 54 is also provided with a slot 64 which is adapted to mate with the exterior slot 62. Both the tongue 54 and the flange 58 have apertures 66 and 68 arranged to align when the slide 42 is moved forwardly into its locked position. The slots 62 and 64 are adapted to receive a pin such as a resilient clip 70 for temporary closure of the slide 42 with respect to the frame 24 while the apertures 66 and 68 are adapted to receive a padlock 72 to secure the slide 42 in place on a more permanent basis.

In operation, the tank cover 10 is fitted to the tank 12 by first lowering the rear end 32 of the frame onto the top of the tank, using the slide handle to hold the slide 42 in its open position. The rear end 32 is lowered and manipulated to cause the tabs 40 to engage below the shelf 22. The front end 30 is then lowered onto the top of the tank, and the slide 42 is then slid toward the forward end 30, causing its tabs 48 to engage underneath the interior peripheral shelf 22 at this end of the tank and the tongue 54 to move through the slot 56. The tongue 54 and the flange 58 may then be secured by pin or padlock.

Once this is accomplished, the cover is securely held in place on the tank and cannot be removed either by the animal inside the tank or a person or child exterior of the tank. The only way to remove the cover is by concious effort in removing the pin or padlock first. It will be observed that once the slide 42 is moved into operative position, the hooks 38 at the rear and the hooks 46 at the front are tensioned against each other and cannot, by vibration, animal pushing, or banging on the cover, be removed from their locked position. Of course, once the pin or padlock is removed, the cover can be easily removed.

The present cover has an advantage in that the same degree of locking will be effected on tanks having a range of lengths—that is, since the slide is moveable over the width of the enlarged wall, a throw or traverse of several inches is possible to effect engagement of the hooks 46 with the shelf 22. Furthermore, since locking engagement is effective within the interior of the tank, the spacing of the depending vertical walls 36 of the frame from the face of the tank or the band 20 is not critical. An attempt to pry the cover off the tank from the outside is most difficult, if not impossible. The tensioning of the hooks in the opposite direction further adds to stability and security.

While the above description contains many specificities, these should not be construed as limitations of the scope of the invention but rather as an exemplification of the preferred embodiment thereof. Accordingly, the scope of the invention should not be determined by the embodiments illustrated but by the appended claims and their legal equivalents.

What is claimed is:

1. In combination with an animal tank, comprising a polygonal container open at its top to form a continuous edge, a continuous band located over said edge having a portion depending therefrom on the exterior surface of the container and a portion depending on the interior surface formed with a horizontally extending shelf, a cover comprising a frame having front rear and side edges arranged to conform in shape to the top of said tank and adapted to be seated over the band thereof, said frame having means depending from the interior of said frame along an opposing pair of edges adapted to engage below said shelf, one of said engaging means being fixed and the other of the engaging means having a handle slidable in the cover frame and operable to move said other engaging means in a horizontal direction toward and away from the edge between a first portion removed from the interior shelf and a second portion engaging below the interior shelf and tensioning said frame in cooperation with the other means in closed position.

2. A cover for an animal tank, having an interior shelf along the top edge, comprising:
- a rectilinear frame, having a horizontal frame wall forming the top portion of said frame and a vertical frame wall depending from the perimeter of said horizontal frame wall;
- a pair of oppositely outward facing hook means underneath said frame, one of said hook means being fixed to and depending from the underside of said frame near a first end of said frame; and
- a slide mounted underneath said frame near a second end of said frame, the second of said hook means being fixed to and depending from the underside of said slide, said slide having a tongue extending through a slot in the vertical frame wall at said second end and having a handle extending through a slot in the horizontal wall, said frame being sized to have the horizontal walls rest in use on the top of the tank with the vertical walls depending alongside the exterior thereof, and said slide being movable in opposition to said fixed hook means between a first position wherein the hook means are adapted to be out of engagement with the shelf and a second position wherein the hook means are adapted to engage with and beneath the shelf to secure the cover to the top of the tank, said tongue having means for securing said slide in said second position.

3. The apparatus as set forth in claim 2, wherein said frame has a central opening enclosed by a screen.

4. The apparatus according to claim 2, wherein said frame is provided with a flange fixedly extending from the forward edge of said frame in cooperation with said tongue and is provided with apertures aligned with aperture in said tongue for simultaneous receipt of the securing means.

* * * * *